United States Patent [19]

Pizzocri

[11] 4,022,495
[45] May 10, 1977

[54] SAFETY DEVICE FOR A MOTOR VEHICLE STEERING SYSTEM

[75] Inventor: Guido Pizzocri, Gerenzano (Varese), Italy

[73] Assignee: Industria Napoletana Costruzione Autoveicoli Alfa Romeo ALFASUD S.p.A., Italy

[22] Filed: Aug. 27, 1975

[21] Appl. No.: 608,288

[30] Foreign Application Priority Data

Sept. 11, 1974 Italy .................................. 27183/74

[52] U.S. Cl. .............................. 280/750; 74/492; 188/1 C
[51] Int. Cl.² .......................................... B62D 1/18
[58] Field of Search .......... 74/492, 493; 280/150 B, 280/748, 750, 87 A, 87 R; 188/1 C

[56] References Cited

UNITED STATES PATENTS

| | | | |
|---|---|---|---|
| 2,114,663 | 4/1938 | Erickson | 74/493 |
| 3,468,182 | 9/1969 | Shwartzberg | 188/1 C X |
| 3,470,761 | 10/1969 | Okamoto et al. | 188/1 C X |
| 3,769,851 | 11/1973 | Edme et al. | 188/1 C X |
| 3,855,876 | 12/1974 | Albrecht et al. | 188/1 C X |
| 3,864,988 | 2/1975 | Adams | 74/492 |
| 3,923,319 | 12/1975 | Nonak a et al. | 280/750 X |
| 3,934,897 | 1/1976 | Moos | 74/492 X |

*Primary Examiner*—Joseph F. Peters, Jr.
*Assistant Examiner*—Michael J. Forman

[57] ABSTRACT

The present invention is concerned with a safety device for a motor vehicle system. According to the invention, a yieldable structure able to yield under a certain force and essentially in the direction of its application is located between the steering column and the motor vehicle body; moreover, the steering column includes universal joints permitting its deformation, by which the structure can yield in the above-mentioned direction.

2 Claims, 4 Drawing Figures

SAFETY DEVICE FOR A MOTOR VEHICLE STEERING SYSTEM

FIELD OF THE INVENTION

This invention relates to a safety device for motor vehicle steering systems, of the type able to absorb kinetic energy transmitted to the steering wheel-steering column assembly by the driver's body in cases of accident, and in particular in cases of frontal impact.

BACKGROUND OF THE INVENTION

Previously proposed devices of this type mostly rely on relatively yieldable structures which, situated between the steering system and the motor vehicle body, yield axially under a predetermined load, so absorbing energy.

One of the most important problems to be solved in the design of such safety devices is the problem of minimizing the possibility of their jamming or sticking due to the emergence of excessive component forces obliquely or perpendicular to the direction of yielding scheduled for the yieldable structure.

SUMMARY AND OBJECTS OF THE INVENTION

The main object of the present invention is to solve this problem, and to this end a safety device for a motor vehicle steering system is provided, wherein between the steering column and motor vehicle body there is provided a yieldable structure able to yield under a certain force and essentially in the direction of its application, the steering column lowerly comprising means for inducing its deformation, by which the structure is enabled to yield in said direction.

In a preferred embodiment of the invention, the yieldable structure is a telescopic structure in which friction members are located between those elements which are subject to relative movement.

The characteristics of the invention and its advantages with respect to the known art will be evident from the description given hereinafter of a preferred embodiment of the invention, with reference to the accompanying drawings in which:

DESCRIPTION OF A PREFERRED EMBODIMENT

Figure 1:
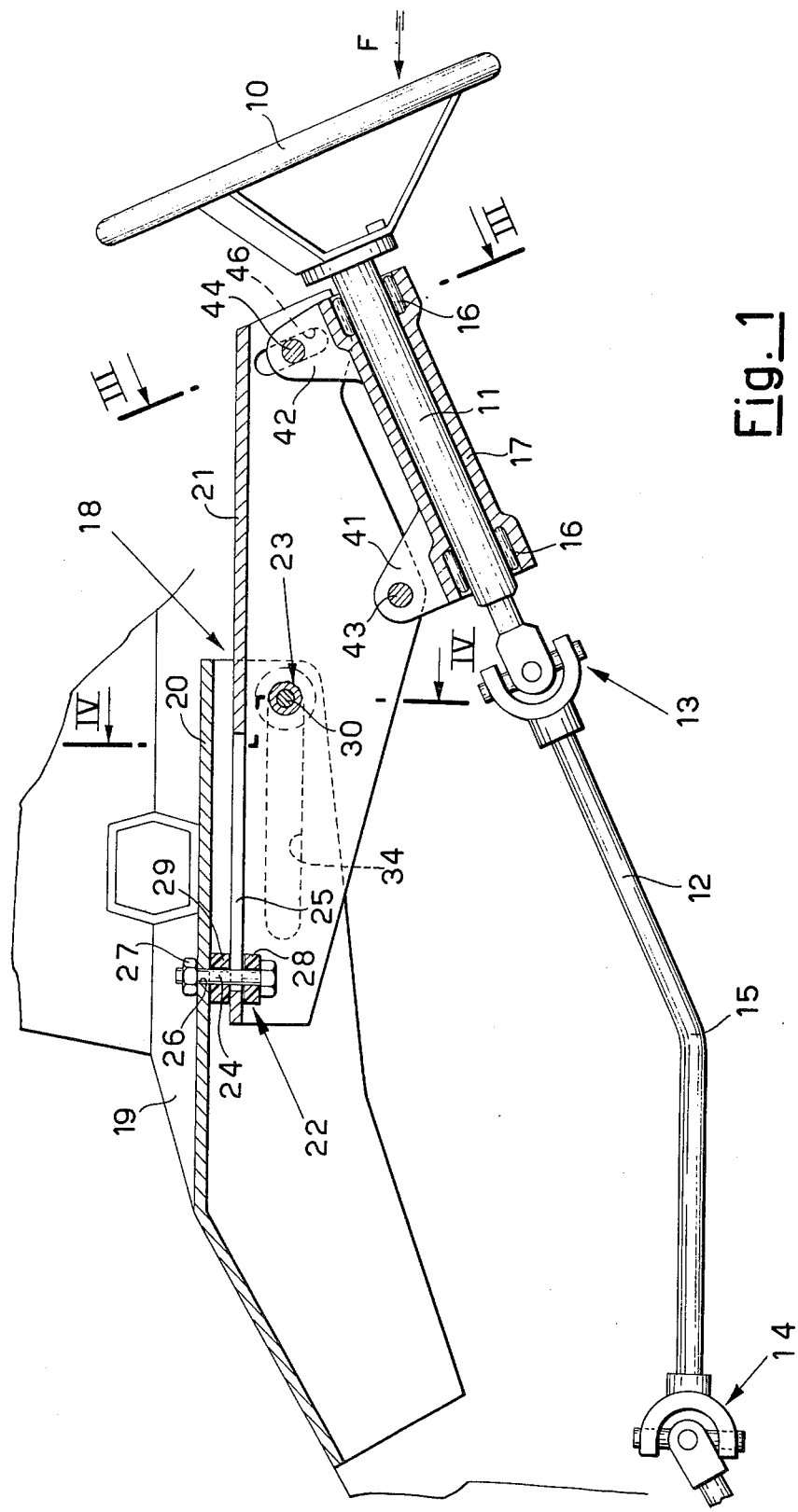
FIG. 1 is a vertical section showing part of a motor vehicle steering system provided with the safety device according to the present invention, the device being shown in the normal operating position of the system.

The steering system shown partially on the drawings and incorporating the invention comprises a steering wheel 10 fixed to a steering column consisting of two portions 11, 12 connected together by a first universal joint 13.

A second universal joint 14 connects the steering column to the steering box (not shown).

Characteristically, the lower portion 12 is not straight, but comprises a bend inducing deformation.

The upper portion 11 is mounted on terminal rolling bearings 16 in a sleeve 17, which is supported by a telescopically deformable structure, indicated generally at 18, and fixed to the motor vehicle body 19.

Figure 3:
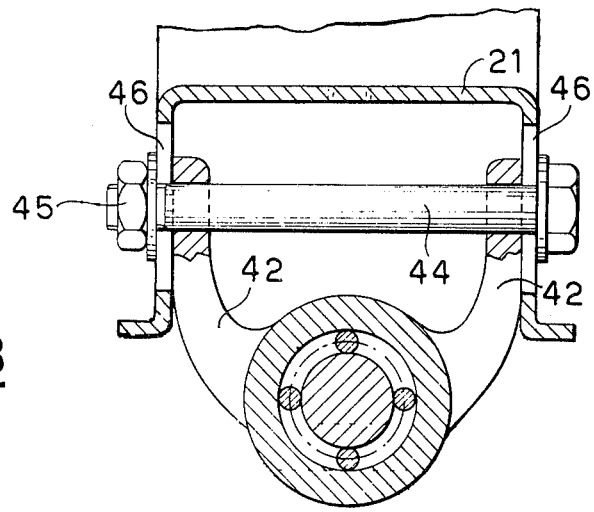
FIG. 3 is an enlarged section on the line III—III of FIG. 1.
Figure 4:
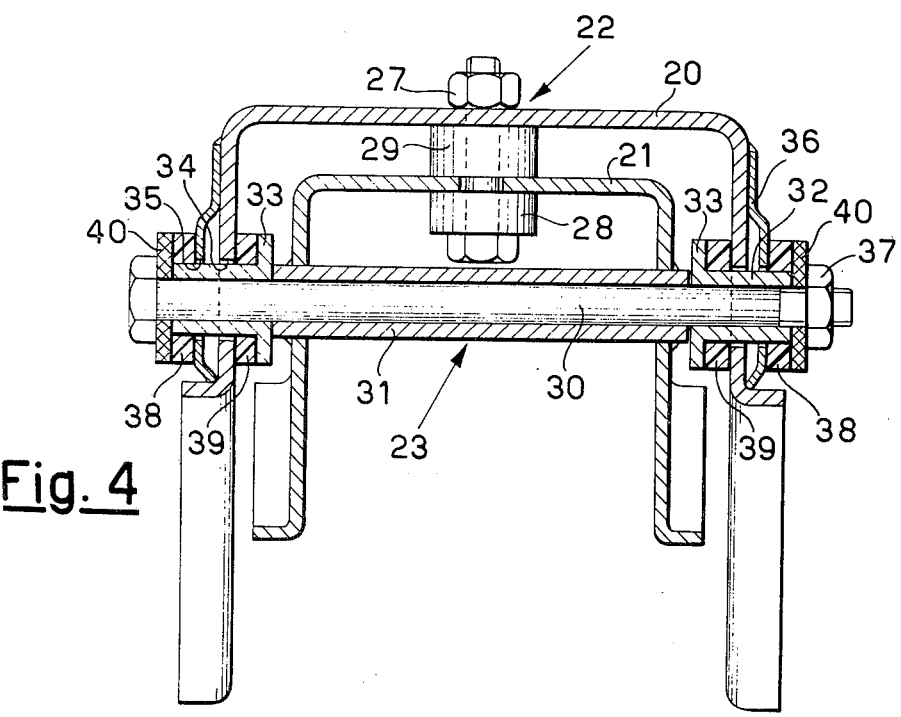
FIG. 4 is an enlarged section on the line IV—IV of FIG. 3.

More precisely, the telescopic structure 18 comprises two brackets 20, 21, generally of "C" cross-section (FIGS. 3 and 4).

The upper bracket 20 is rigidly fixed to the body 19 by means which are not shown, while the lower bracket 21 is constrained by the bracket 20 in such a manner that it can slide axially with respect to this latter.

This constraint between the brackets 20 and 21 is provided by two connection assemblies, generally indicated by 22 and 23, and shown enlarged in FIG. 4.

The assembly 22 consists of a bolt 24 passing through an elongated slot 25 and a hole 26, in the brackets 21 and 20 respectively. A nut 27 locks the bolt on to this latter. This lock is effected by placing two friction pads 28 and 29 between the head of the bolt and the bracket 21, and between this latter and the bracket 20 respectively.

The assembly 23 (FIG. 4) consists of a bolt 30 passing through a sleeve 31 fixed to the bracket 21, and through end bushes 32 flanged at 33, which are inserted into respective elongated slots 34 and 35 in the arms of the "C" and in sliding strips 36 superimposed on these arms, respectively.

The assembly is fixed by a nut 37, by way of friction pads 38 and 39 between the washers 40 and sliding strips 36, and between the flanges 33 and the inner surface of the arms of the "C" respectively. The strips 36 are made of relatively yieldable sheet metal, and their distance from the arms of the "C" increases towards the front of the vehicle, so as to create a certain resistance to the sliding of the bracket 21 in the bracket 20.

FIG. 3 shows how the steering system, i.e., sleeve 17, is secured to the telescopic structure 18.

Two terminal forks 41 and 42 extend from the sleeve 17. The fork 41 is pivoted on a pivot 43 extending between the arms of the bracket 21.

The fork 42 is constrained by a bolt 44 and nut 45 which can be locked in an adjustable position between slots 46 in the arms of the bracket 21. It is thus possible to adjust the level of the steering wheel 10.

Figure 2:
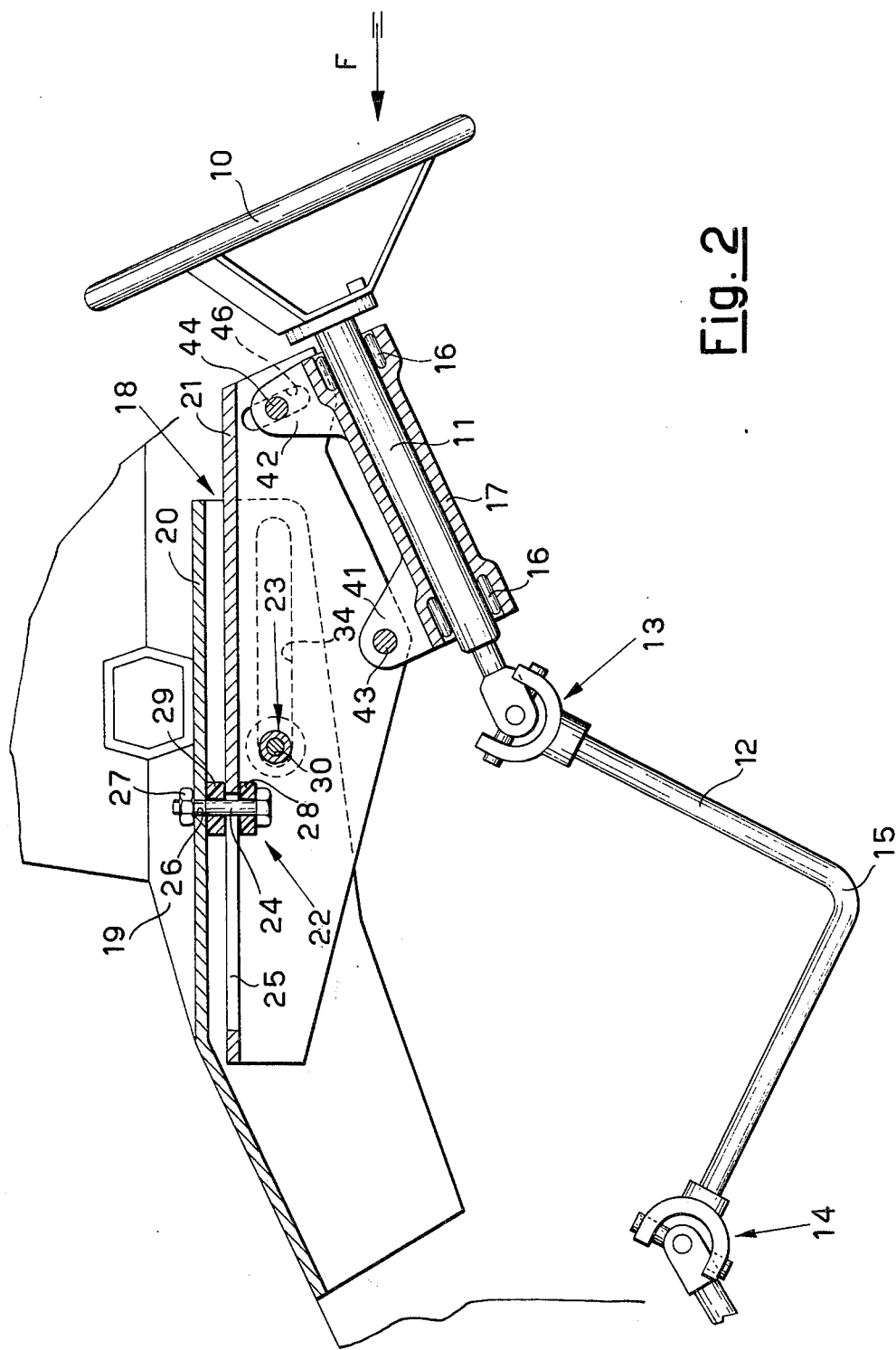
FIG. 2 is a view analogous to FIG. 1, but showing the behaviour of the safety device in cases of accident leading to impact of the driver's body against the steering wheel of the steering system.

The operation of the steering system comprising the safety device heretofore described is as follows;

When in cases of accident, the driver's body is projected violently against the steering wheel 10 in the direction of the arrow F, the force of impact is largely absorbed by the deformation of the assembly from the position shown in FIG. 1 to the position shown in FIG. 2. In this respect, because of the force applied to the steering wheel 10, the bracket 21 is urged to advance in the bracket 20, and the lower portion 12 of the steering column is simultaneously urged to deform at the inducement means 15. In this manner, energy is dissipated by the friction between the pads 28, 29 and the opposing surfaces of the bracket 21, between the pads 38 and the sliding strips 36, and between the pads 39 and the inner surface of the arms of the bracket 20. Further energy is dissipated in deforming the strips 36 which preferably diverge as heretofore stated. Further energy is dissipated in bending the portion 12.

The characteristics of the telescopic structure 18 and steering column have been chosen in such a manner that during application of a force of impact against the steering wheel, the telescopic structure and steering column at all times absorb quantities of energy which are suitably complementary, because of which the assembly always moves parallel to itself in the direction of application of the force, the value of which remains as constant as possible during the advancement of the device.

The facility of the device to absorb energy is thus optimized, and at the same time the formation of excessive components obliquely or perpendicular to the direction of application of the force, which could cause jamming of the safety device, is avoided.

Although one preferred embodiment of the invention has been illustrated and described, it will be evident that modifications may be made to it without leaving the scope of the inventive idea. For example the connection assemblies 22, 23 between the brackets 20 and 21 could be of different structure. The friction pads may have various configurations, as may be sliding strips 36 which, in the limit, could also be dispensed with. In their place, tapered channels could, for example, be provided in which an element such as a washer slides, mounted on the bolt 30. The advancement of the washer, which would be of the same diameter as the maximum starting width of the tapered channel, would deform this latter with absorption of energy.

The means for inducing deformation provided on the steering column could also be different.

The true scope of the invention is therefore defined only by the following claims.

What we claim is:

1. A safety device for a steering column of a vehicle, comprising:
    a vehicle body;
    a steering column inclined downwardly relative to a horizontal plane on said vehicle body, said steering column comprising at least an upper and lower elongated part terminally connected by universal joints, a lower portion of the lower elongated part having an intermediate deformation-inducing portion for absorbing impact when subject to impact of a driver striking the steering column at a predetermined force;
    a sleeve rotatably-supporting the upper steering column part;
    a first bracket fixed to said vehicle body;
    a second bracket disposed within said first bracket, said brackets including horizontally disposed slot portions, bolt assemblies extending from the brackets through said slot portion whereby the brackets have relative horizontal movement and are restrained to such relative movement, said sleeve rotatably-supporting the upper steering column part depending from said second bracket; and
    friction-increasing members mounted on the bolt assemblies on brackets and between adjacent surfaces of the brackets whereby the relative horizontal movement between the brackets is resisted.

2. A safety device for a motor vehicle steering system provided with a steering column inclined with respect to a horizontal plane on the vehicle, said device comprising a yieldable structure arranged between an upper portion of the steering column and a portion of the motor vehicle body, said yieldable structure including impact-responsive means yieldable in response to a horizontal component of force due to driver-impact on the inclined steering column, said steering column including deformation-inducing means for absorbing impact energy and permitting the yieldable structure to be horizontally displaced relative to the vehicle body in a horizontal direction, said deformation-inducing means comprising a bend in a lower portion of the steering column, said yieldable structure comprising telescopically-related elements, and friction members interposed between the telescopically-related elements and subject to relative movement therebetween, said telescopically-related elements comprising two brackets having a C-shaped cross-section, one bracket being secured to the vehicle body and the other bracket being received in the one bracket and supporting the steering column, connection means between said brackets and permitting relative movement therebetween, and friction members interposed between said brackets, said brackets including horizontally-extending slots, said connection means comprising bolt assemblies anchored on a bracket and projecting through a respective slot of a bracket for restraining the brackets to relative horizontal movement, said friction members comprising friction pads mounted on the bolt assemblies and interposed between adjacent surfaces of the brackets, the brackets including overlying arms, one of said bolt assemblies projecting through arms on one bracket and slots on the arms of the other bracket, and strip elements mounted on said one bolt assembly and diverging in the direction the one bracket slides forward relative to the other bracket whereby resistance to movement between the brackets increaases as one bracket moves forwardly relative to the other.

* * * * *